United States Patent Office 3,801,525
Patented Apr. 2, 1974

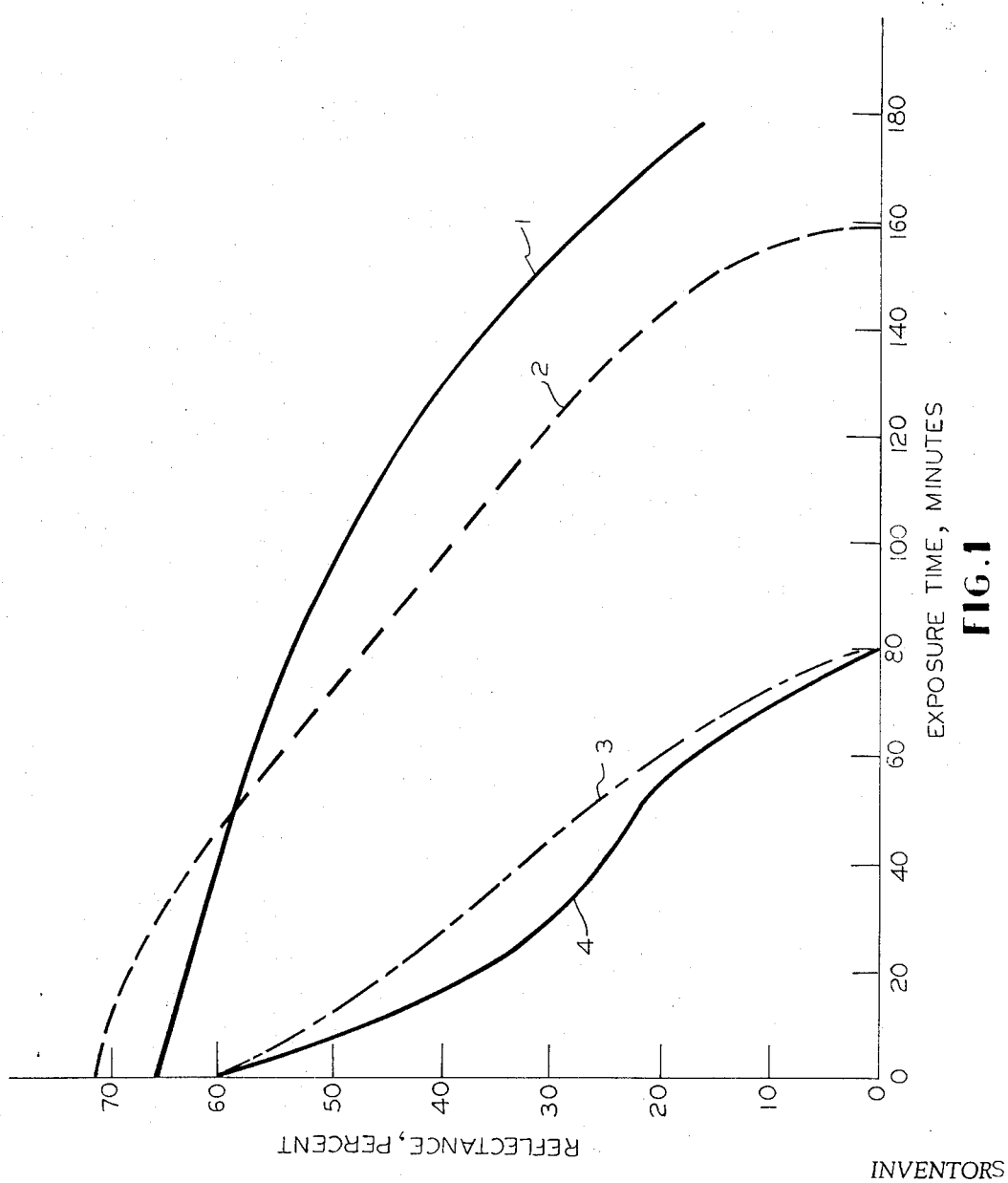

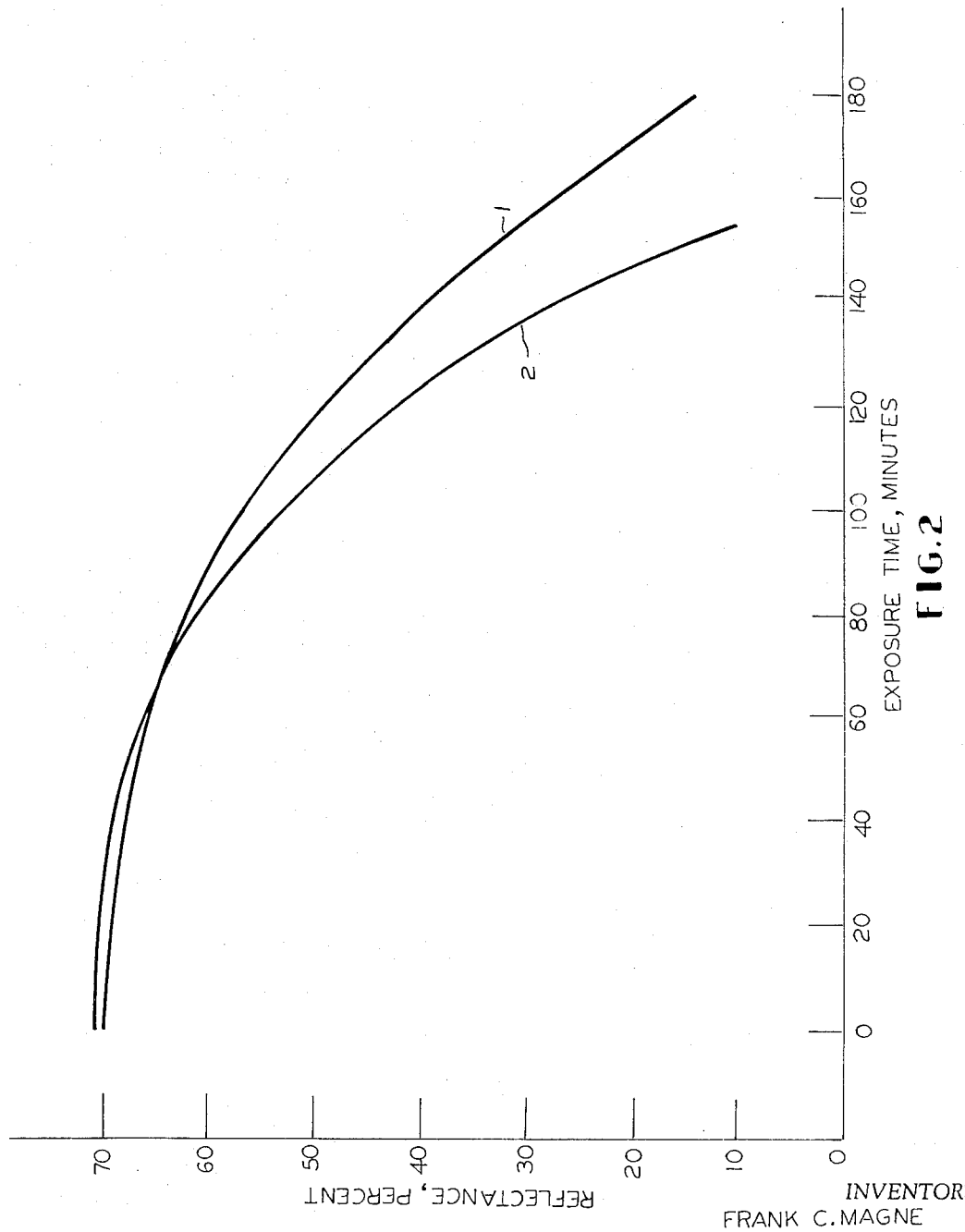

3,801,525
EPITHIOAMIDES AS PLASTICIZER-STABILIZERS
Frank C. Magne, Robert R. Mod, and Gene Sumrell, New Orleans, La., assignors to the United States of America as represented by the Secretary of Agriculture
Filed Aug. 31, 1971, Ser. No. 176,622
Int. Cl. C08f 19/14, 21/04
U.S. Cl. 260—30.2                                  4 Claims

ABSTRACT OF THE DISCLOSURE

N-(9,10-epithiostearoyl)morpholine, N,N-dibutyl-9,10-epithiostearamide and epithio soybean oil are disclosed as thermal-stabilizers for polyvinyl chloride compositions which have better compatibility characteristics with polyvinyl chloride compositions than the analogous expoxides.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to N-epithioacyl amines and N, N-disubstituted epithioamides useful as stabilizer-plasticizers for polyvinyl chloride resins and copolymers thereof containing predominate proportions of vinyl chloride.

A primary object of this invention is to provide a stabilizer for vinyl chloride resins. Another object is to develop a compound with stabilizing characteristics which does not exude from the resin composition and which can be employed if desired at plasticizer levels without exudation.

The N-epithioacyl amines and N,N-disubstituted epithioamides of long chain fatty acids referred to may be represented by the formula

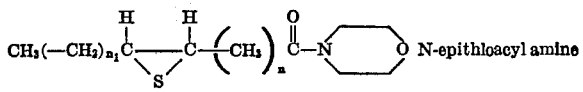 N-epithioacyl amine or

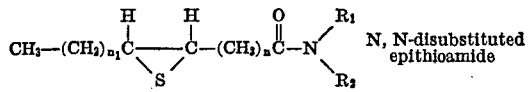 N, N-disubstituted epithioamide where $n$ may range from 5 to 9 and $n_1$ from 5 to 10 and where $R_1$ and $R_2$ are the same or different alkyl groups which may range from $CH_3$ to $C_{10}H_{21}$ but wherein the sum of the carbons in both $R_1$ and $R_2$ cannot exceed 12 for a nonexuding material at plasticizing levels; i.e., 55 parts of epithio compound per 100 parts of resin.

It is well known by those skilled in the art that epithio derivatives, the sulfur analog of epoxides, may be obtained by reacting an epoxide with thiourea, a substituted thiourea, or a thiocyanate in a solvent reaction medium such as acetone. Those skilled in the art also know that higher yields of epithio are obtained if an acid such as benzoic is employed in molar equivalence to that of the thiourea.

EXAMPLE 1

(N,N-dibutyl-9,10-epithiostearamide)

100 grams (0.24 mole) of N,N-dibutyl-9,10-epoxystearamide containing 3.45% oxirane oxygen (3.91 theory) was added dropwise with stirring to 55.7 g. (0.73 mole) thiourea and 89.5 g. (0.73 mole) benzoic acid in 500 ml. of acetone. Stirring was continued for 3 hours beyond the addition. An aqueous solution of $Na_2CO_3$ (38.8 g. in minimal water) was added with stirring, followed by sufficient water to solubilize the solids. The organic phase was extracted with hexane, washed, dried, and stripped. Sulfur content was 6.41% (theory 6.67%).

EXAMPLE 2

(N,N-dibutyl-9,10,12,13-diepithiostearamide)

100 g. (0.24 mole) N,N-dibutyl-9,10,12,13-diepoxystearamide was added dropwise with stirring to a mixture of 111.4 g. (1.46 moles) of thiourea and 179.0 g. (1.46 moles) benzoic acid in 1 liter of acetone. Stirring was continued for three hours following addition. The benzoic acid was neutralized by adding the requisite amount of $Na_2CO_3$, 77.8 g., as a 10% aqueous solution. The organic phase was extracted with hexane and washed, dried, and stripped. Sulfur content was 11.17% (theory 14.06%).

EXAMPLE 3

(Epithio soy oil)

Epoxidized soy oil containing 7.1% oxirane oxygen was converted to the analogous epithio soy oil following the procedure described in Example 1 except that the amounts of thiourea and benzoic acid were increased to 9.4 moles per mole of epoxidized material. The quantity of acetone and $Na_2CO_3$ were also increased proportionally. Sulfur analysis showed 9.31% present (theory 12.42%).

The epithio compounds were evaluated as thermal stabilizers in a number of compositions employing auxiliary stabilizers, either a tin mercaptide or a coprecipitated barium-cadmium dilaurate. The thermal stability of the compositions were compared with similar compositions stabilized with the analogous epoxide. The relative stabilities of the respective compositions were established in terms of relative reflectance measurements obtained on sheeted samples of each composition which had been exposed for selected time intervals in a forced draft oven at 176° C.

The thermal stabilities of an epithio, epoxy and a nonepoxy control composition employing a Ba-Cd dilaurate auxiliary stabilizer are graphically represented in FIG. 1 of the accompanying drawing. It is clear that the epithio-containing composition is definitely superior to the control and at least the equal of the analogous epoxy containing composition.

In curve 1 of FIG. 1, N,N-dibutyl-9,10-epithiostearamide is employed at a level of 55 parts per 100 parts PVC with no detectable compatibility problem.

The easier processibility of the composition stabilized with epithiolated soy oil, curve 2, FIG. 1, over the analogous epoxidized soy oil, curve 3, FIG. 1, shows that even an epithio glyceride is more compatible than the analogous epoxy glyceride and provides at least comparable stabilization. Curve 4, FIG. 1 shows the unstabilized-plasticized vinyl resin.

The curves in FIG. 2 of the accompanying drawing show that the epithioamide gives comparable, perhaps even slightly better performance than the epoxyamide when both are used in conjunction with a tin mercaptide auxiliary stabilizer in the following formulation.

| Curve 1 | | Curve 2 | |
|---|---|---|---|
| Geon 101, g | 17.2 | Geon 101, g | 17.9 |
| N,N-dibutyloleamide, g | 9.46 | N,N-dibutyloleamide, g | 9.8 |
| Advaslab T 360,[1] g | 0.55 | Advaslab T 306,[1] g | 0.57 |
| Advaslab CH 300,[2] g | 0.05 | Advaslab CH 300,[2] g | 0.05 |
| Stearic acid, g | 0.14 | Stearic acid, g | 0.14 |
| N,N-dibutyl-9,10-epithio-stearamide | 2.75 | N,N-dibutyl-9,10-epoxy-stearamide | 1.43 |

[1] Polymeric dibutyl tin modified mercaptide.
[2] Alkyl aryl phosphite.

We claim:
1. A non-exuding, thermally stable composition of matter consisting essentially of a vinyl chloride polymer containing from 4 to 55 parts per 100 parts of resin of a disubstituted amide selected from the group consisting of N,N-dibutyl-9,10-epithiostearamide, N,N-dibutyl-9,10-12,13-diepithiostearamide, and N-(9,10-epithiostearoyl)morpholine.

2. The composition of claim 1 wherein the disubstituted amide is N,N-dibutyl-9,10-epithiostearamide.

3. The composition of claim 1 wherein the disubstituted amide is N,N-dibutyl-9,10-12,13-diepithiostearamide.

4. The composition of claim 1 wherein the disubstituted amide is N-(9,10-epithiostearoyl)morpholine.

References Cited

UNITED STATES PATENTS

| 3,403,126 | 9/1968 | Mod et al. | 260—30.4 R |
| 2,739,151 | 3/1956 | Rosch et al. | 260—327 TH |
| 2,743,280 | 4/1956 | Feasley et al. | 260—327 TH |
| 3,420,837 | 1/1969 | Skau et al. | 260—294.7 |
| 2,962,457 | 11/1960 | MacKinney | 260—327 E |
| 2,824,845 | 2/1958 | Kosnin | 260—327 E |

OTHER REFERENCES

"The Stabilization of Polyvinyl Chloride," Chevassus, 1963 (pp. 134–137).

DONALD E. CZAJA, Primary Examiner
W. E. PARKER, Assistant Examiner

U.S. Cl. X.R.

260—45.8 K, 327 R